United States Patent [19]
van der Lely et al.

[11] Patent Number: 5,046,664
[45] Date of Patent: Sep. 10, 1991

[54] SPREADER

[75] Inventors: Ary van der Lely, Maasland; Cornelis J. G. Bom, Rozenburg, both of Netherlands

[73] Assignee: C. van der Lely, N.W., Maasland, Netherlands

[21] Appl. No.: 549,241

[22] Filed: Oct. 26, 1983

Related U.S. Application Data

[60] Division of Ser. No. 325,127, Nov. 27, 1981, abandoned, and a continuation-in-part of Ser. No. 35,075, May 1, 1979, and Ser. No. 89,755, Oct. 30, 1979.

[30] Foreign Application Priority Data

Nov. 27, 1980 [NL] Netherlands .......................... 8006454

[51] Int. Cl.$^5$ .............................................. A01C 17/00
[52] U.S. Cl. ..................................... 239/661; 239/682; 239/683; 239/684; 239/687
[58] Field of Search ................... 91/436; 239/661, 670, 239/682, 683, 684, 687

[56] References Cited

U.S. PATENT DOCUMENTS

| | | | |
|---|---|---|---|
| 1,776,814 | 9/1930 | Lutz | 239/682 |
| 2,537,913 | 1/1951 | Rimple | 239/682 |
| 3,167,319 | 1/1965 | Kerr | 239/684 X |
| 3,559,893 | 2/1971 | Gruben | 239/682 |
| 3,615,055 | 10/1971 | van der Lely et al. | 239/687 X |
| 3,652,019 | 3/1972 | van der Lely | 239/682 |
| 3,904,129 | 9/1975 | Lorenc | 239/650 |
| 4,205,793 | 6/1980 | van der Lely | 239/682 |
| 4,316,581 | 2/1982 | van der Lely | 239/682 |
| 4,432,270 | 2/1984 | Kyster | 91/436 |

FOREIGN PATENT DOCUMENTS

| | | | |
|---|---|---|---|
| 101977 | 9/1937 | Australia | 239/684 |
| 125198 | 8/1947 | Australia | 239/670 |
| 2044566 | 3/1979 | Fed. Rep. of Germany | 239/682 |
| 391691 | 9/1908 | France | 239/682 |
| 2281795 | 4/1978 | France |  |
| 0047185 | 4/1977 | Japan | 91/436 |
| 96314 | 7/1960 | Norway | 239/682 |
| WO8302382 | 7/1983 | PCT Int'l Appl. | 239/682 |
| 854051 | 11/1960 | United Kingdom | 239/682 |
| 2020154 | 11/1979 | United Kingdom | 239/682 |
| 2034163 | 6/1980 | United Kingdom | 239/682 |

Primary Examiner—Andres Kashnikow
Attorney, Agent, or Firm—Penrose Lucas Albright

[57] ABSTRACT

A spreader for granular and/or powdery material such as fertilizer comprises a hopper having two delivery parts. Distribution members are provided under the delivery parts for broadcasting material fed to them from the hopper. The distribution members are mounted on a carrier rigidly supported by the hopper. This construction results in a fixed position of the distribution member with respect to the delivery parts, regardless of deflections which may occur as a result of the weight of material in the hopper. The distribution members may be driven by a mechanical transmission from a power take-off shaft of a tractor, or by a hydraulic motor. The mechanical transmission includes a horizontal shaft connected to two vertical shafts for rotating the distribution members via bevel gears and is contained in a hollow tube with gear boxes on either end which maintain the axes and levels of the vertical shafts and distribution members in fixed relative positions. The tube and gear boxes are part of the framework connected rigidly to the delivery parts which maintains them and the distribution members in fixed relative positions. The hydraulic motor is connected directly to the horizontal shaft and mounted on one of the gear boxes.

35 Claims, 6 Drawing Sheets

SPREADER

RELATED APPLICATIONS

This is a division of application Ser. No. 325,127, filed Nov. 27, 1981, now abandoned, and a continuation-in-part of application Ser. Nos. 035,075 and 089,755 filed May 1, 1979 and Oct. 30, 1979, respectively.

SUMMARY OF THE INVENTION

This invention relates to a spreader for spreading granular and/or powdery material. Spreaders of this type comprise a frame having coupling means for attaching the spreader to the lifting device of a tractor or a similar vehicle. A hopper, which may have at least two delivery parts, and at least two distribution members adapted to move about upwardly extending axes are arranged on the frame. Material to be spread is fed from the hopper through the delivery parts to the distribution members.

With known machines of this general type, the frame may distort to an extent such that the positions of the outlet openings with respect to the distribution members change. This may cause undesirable wear of the dosing system and result in inaccuracy of the distribution pattern.

According to one aspect of the present invention there is provided a spreader for spreading granular and/or powdery material, the spreader comprising a frame provided with coupling means for attaching the spreader to the lifting device of a vehicle and with a hopper having at least two delivery parts and at least two distribution members which are mounted on a carrier for movement about upwardly extending axes, the distribution members being positioned to receive material supplied through the delivery parts from the hopper, the invention being in that the carrier interconnecting the distribution members is coupled to the hopper in an arrangement whereby the distribution members have fixed positions relative to the delivery parts.

Thus, the distribution members may have independently of the weight of the filled hopper, a fixed location, with respect to the delivery parts. In this way the desired location of the distribution members relative to the hopper is not altered during the spreader is operations and the material is therefore continuously be fed in the desired manner to the distribution members.

In an advantageous embodiment of the spreader according to the invention, the carrier is releasably coupled with the hopper. The construction is then such that the distribution members with the carrier can be readily incorporated into the spreader as a single unit. The frame advantageously includes a lower beam by which the spreader can rest on the ground, the carrier being arranged above the lower beam. Slight resilience of the lower beam with respect to the rest of the frame does not matter, since the distribution members are not arranged on it.

The hopper may comprise two delivery parts which are separated from each other and coupled with each other by connecting elements. Thus the delivery parts can be readily arranged in the desired manner with respect to one another on the frame.

An advantageous drive of the distribution members can be obtained by providing the carrier with a motor which is connected with the distribution members by pinions. Particularly when the spreader is intended to be coupled with a tractor or a similar vehicle, the motor may comprise a hydraulic motor, which can be coupled with the hydraulic system of the tractor.

Accordingly, a second aspect of the present invention provides a spreader for spreading granular and/or powdery material comprising a hopper and at least two distribution members to which the material is supplied, in use, from the hopper, characterized in that the two distribution members are intercoupled by gears and are drivable by a hydraulic motor.

A particularly effective embodiment of the invention is obtained when during operation the distribution members are driven and the material is fed to the distribution members in such a manner that the distribution members spread the material over coinciding sectors. With the distribution members and the hopper correctly positioned relative to one another a satisfactory distribution on coinciding sectors can be ensured.

The distribution of the material can be effectively enhanced by providing a distribution member with ejection blades the ends of which further from the upwardly extending rotary axis of the distribution member are located at a higher level than the ends nearer the rotary axis. Thus the material is ejected by the distribution members with an upwardly inclined directed component so that collision of the material ejected by one distribution member with the material ejected by the other is minimized.

An advantageous embodiment is also obtained when the distribution member is movable about an upwardly extending rotary axis and comprises a disc having a surface extending conically downwardly from the circumferential edge towards the center and bearing one or more ejection blades.

The material can be effectively fed to the distribution member when the distribution member is arranged on a shaft which extends upwardly and which, (or a part provided thereon) passes through the bottom of the hopper and is provided inside the hopper with an agitator. The opening for the shaft preferably has an at least slightly flexible sealing member which surrounds the periphery of the shaft (or of the part provided thereon) and is fastened below the bottom and extending along the shaft (or the part provided thereon) into the hopper.

An advantageous embodiment of the agitator comprises a ring which is coaxial with the rotary axis of the distribution member and is connected by spokes with the shaft, the rods extending first slightly upwards away from the ring and then extending downwards towards the hub connection.

The supply of material from the hopper to the distribution members can be advantageously controlled by coupling the dosing members with a control shaft which is mounted at least partly on the hopper. The setting of the dosing members can be satisfactorily controlled by providing the control shaft with a setting member located near one side of the spreader.

The distribution of the material can be further enhanced by disposing the distribution members in an inclined position viewed from one side. The position of the distribution members can be readily checked by providing the spreader with indicating means displaying the orientation of the device with respect to the horizontal.

For a better understanding of the present invention and to show how it may be carried into effect, reference

DESCRIPTION OF THE PREFERRED EMBODIMENTS

Figure 1:
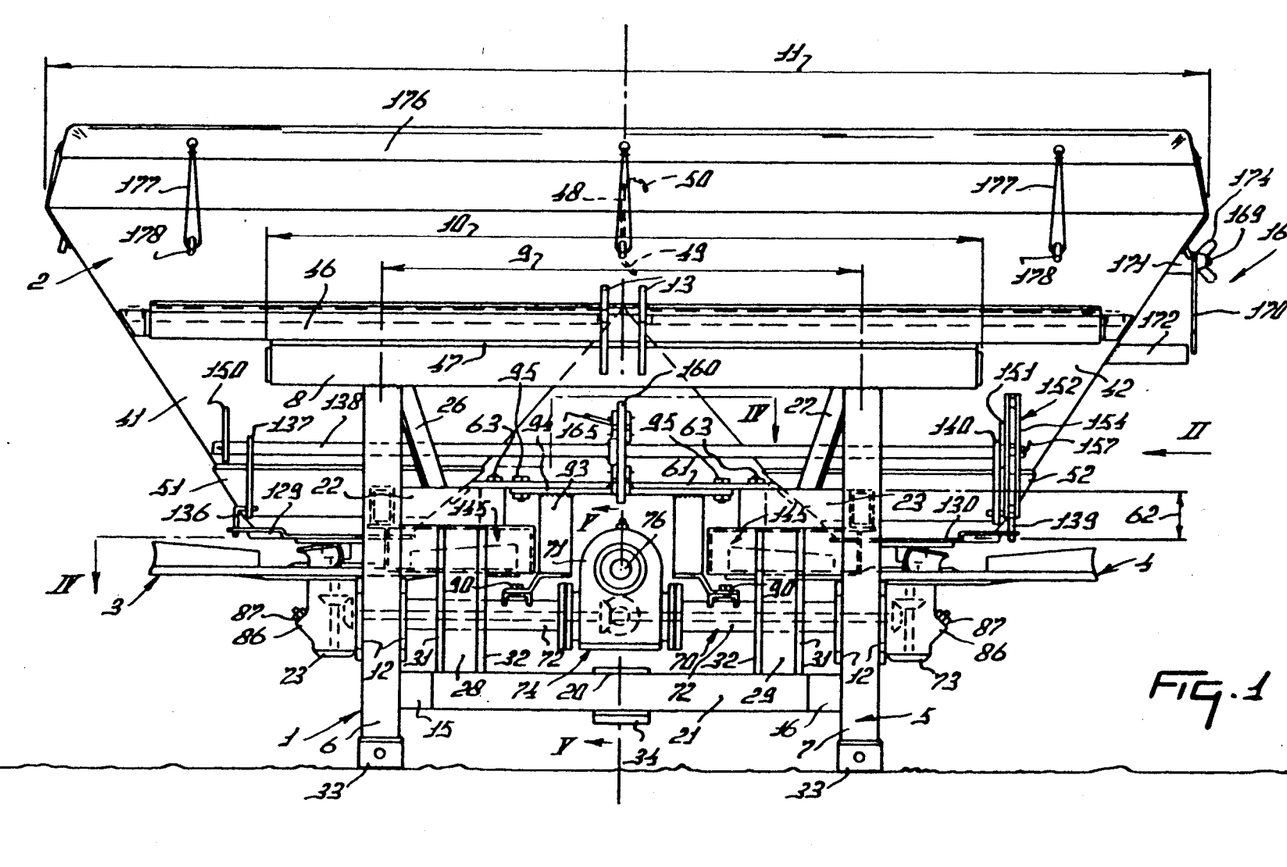
FIG. 1 is a front view of a spreader in accordance with the invention.

Referring to FIGS. 1 to 7, the spreader comprises a frame 1 on which a hopper 2 and distribution members 3 and 4 are arranged. The frame 1 comprises an upwardly extending framework 5 having upright hollow beams 6 and 7 of rectangular cross-section. To the top ends of the beams 6 and 7 is secured a horizontal supporting beam 8 of rectangular cross-section. The distance 9 between the beams 6 and 7 is smaller than the length 10 of the beam 8. The beam 8 projects equally at each end beyond the beams 6 and 7 (FIG. 1). The distance 9 is smaller than one-half the width 11 of the hopper 2 and the length 10 of the beam 8 is greater than one-half the width 11.

The beams 6 and 7 are provided with tags 12 for attachment to the lower lifting arms of a three-point lifting device of a tractor or a similar vehicle to which the spreader is to be hitched. The beam 8 is provided with tags 13, which can be coupled with the top lifting arm of the three-point lifting device.

Figure 2:
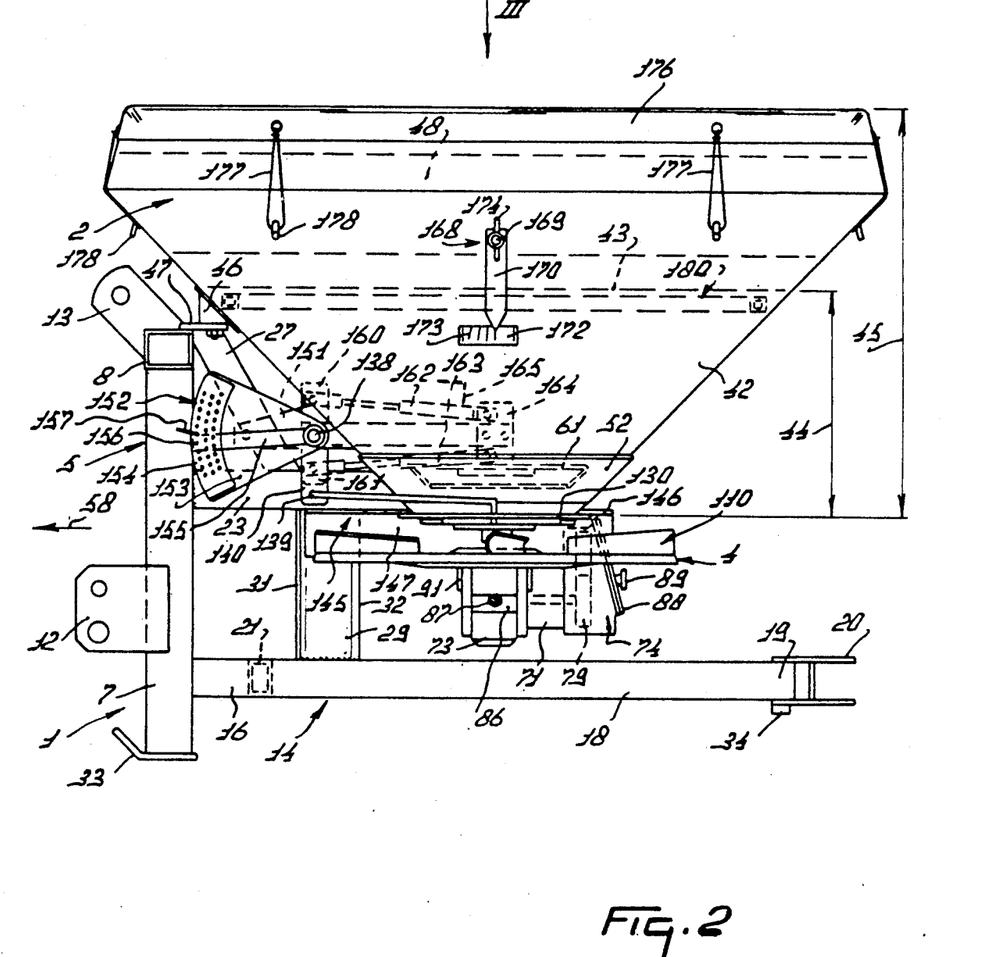
FIG. 2 is a side view of the spreader of FIG. 1 taken in the direction of the arrow II in FIG. 1.
Figure 3:
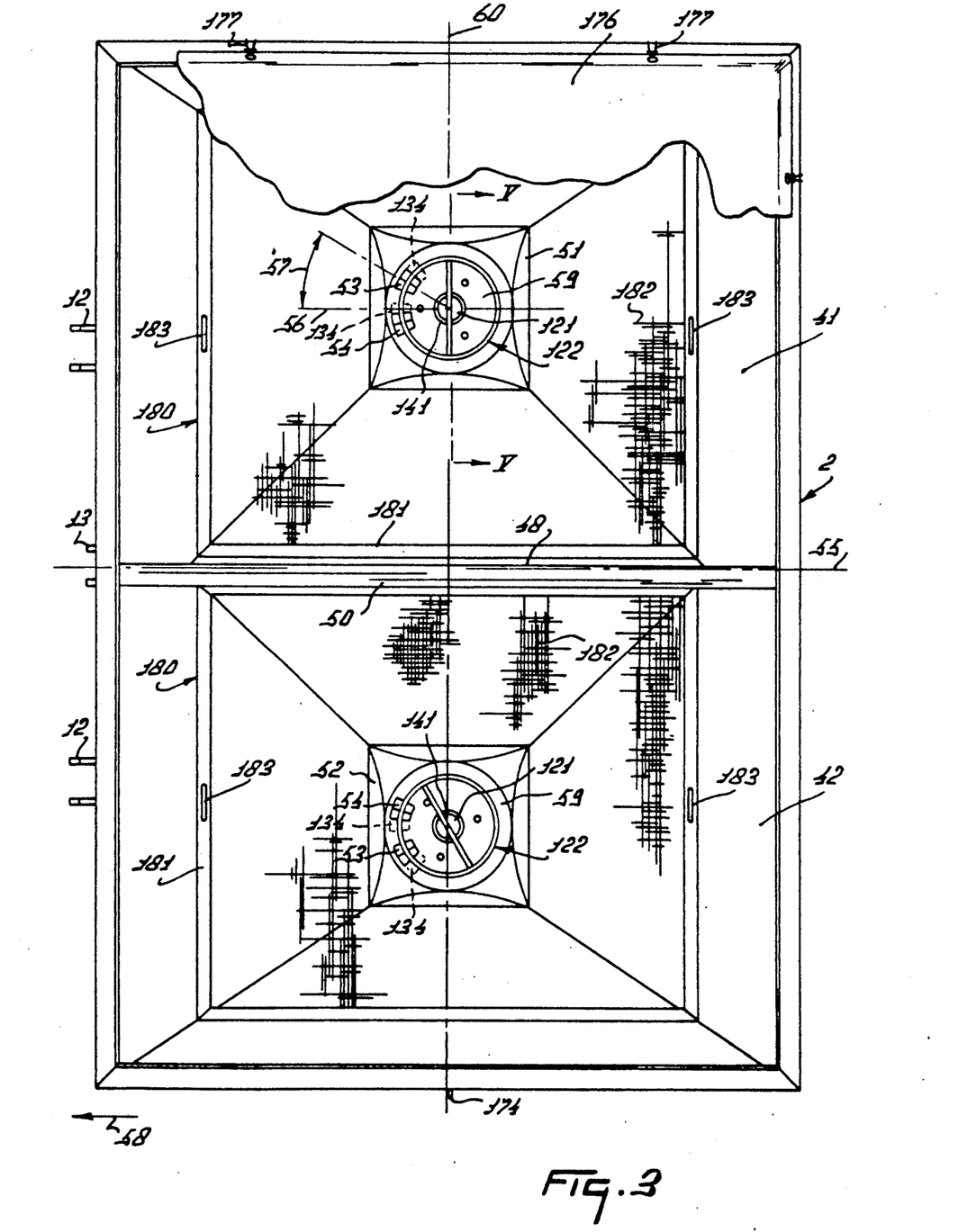
FIG. 3 is a plan view of the spreader of FIGS. 1 and 2, taken in the direction of the arrow III in FIG. 2.
Figure 4:
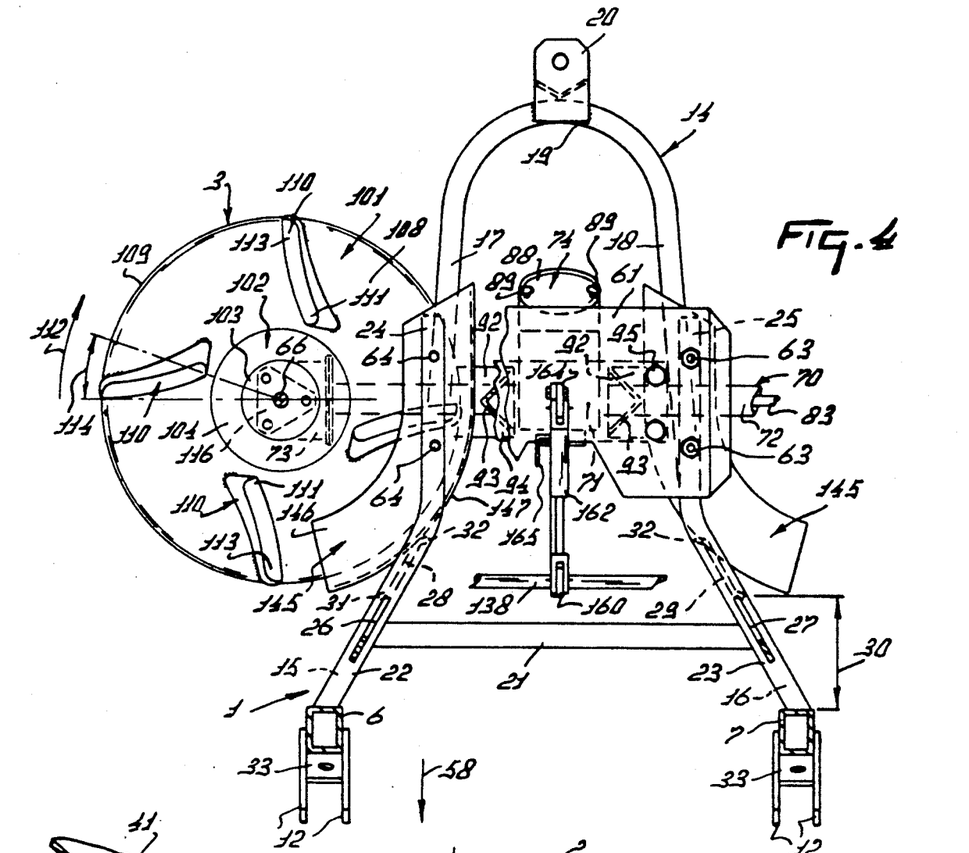
FIG. 4 is a fragmentary plan view of part of the spreader taken on the line IV—IV in FIG. 1.

At a position near their lower ends, the beams 6 and 7 are interconnected by a lower beam 14 which is bell-shaped in outline, beam 14, also being of rectangular cross-section. As can be seen in FIG. 4, the beam 14 has front parts 15 and 16, which converge from the beams 6 and 7 towards the rear and meet substantially parallel rear parts 17 and 18, which are interconnected by a curved part comprising a bend 19. At the bend 19, a drawhook 20 is fastened to the beam 14, this drawhook 20 comprising two strips located one above the other. Near ends of the beam 14 the front parts 15 and 16 are interconnected by a tie beam 21, which also has a rectangular cross-section, as is shown in FIG. 2. Supporting beams 22 and 23 are secured respectively to the beams 6 and 7 at a short distance above their mid-points. The beams 22 and 23 extend away from the rear sides of the beams 6 and 7 and converge in the same manner as the front parts 15 and 16 of the beam 14. The rear parts 24 and 25 of the supporting beams 22 and 23 are parallel to each other and are located generally above the parts 17 and 18 of the beam 14. The connection of the supporting beams 22 and 23 with the beams 6 and 7 is reinforced by struts 26 and 27 extending above the beams 22 and 23. The supporting beams 22 and 23 are connected to the beam 14 by coupling strips 28 and 29. The struts 26 and 27 meet the beams 22 and 23 at a distance 30 from the beams 6 and 7. Viewed in plan (FIG. 4) the connecting strips 28 and 29 are located just behind the rear edges of the lower ends of the strips 26 and 27. The strips 28 and 29 are parallel to the beams 6 and 7 and are at right angles to the beams 14 and beams 22, and 23 respectively. As can be seen from FIG. 4, the front edges 31 of the strips 28 and 29 are bent away from one another towards the outboard sides of the spreader, and the rear edges 32 are bent towards one another and towards the center of the spreader in order to stiffen the strips 28 and 29. The lower ends of the beams 6 and 7 are provided with supporting feet 33 and the rear end of the lower beam 14 has a supporting foot 34. The beams 14, 22 and 23 are at right angles to the framework 5 and are horizontal in the upright position of the spreader.

The hopper 2 comprises two funnel-shaped delivery parts 41 and 42, the junction 43 of the adjoining walls of the delivery parts being located at a height 44 above the hopper bottom. The height 44 is slightly greater than one-half the height 45 of the hopper. At the front, the hopper 2 has a fastening beam 46, which is fastened by bolts to a fastening plate 47. The plate 47 is rigidly secured to the horizontal supporting beam 8. The fastening plate 47 projects to the rear from the beam 8 and it is this projecting part which provides support for the beam 46. The top of the beam 46 is located at the same level as the junction 43 (see FIG. 2). The front and rear walls of the hopper are interconnected above the junction 43 by a stiffening strip 48. The lower edge 49 of the strip 48 is bent over laterally and the top rim 50 thereof is bent over through about 180° (FIG. 1).

The delivery parts 41 and 42 are provided with delivery spouts 51 and 52 respectively, which are independent of the rest of the hopper and which each have two outlet orifices 53 and 54. The outlet orifices 53 and 54 are provided in the bottom 59 of the delivery spouts 51 and 52 respectively. The hopper with the delivery spouts 51 and 52 and the orifices 53 and 54 therein is symmetrical about a plane of symmetry 55 going through the longitudinal center line of the spreader. The frame is also symmetrical about the plane 55. One edge of each orifice 54 is located approximately in a vertical plane 56, which is parallel to the plane of symmetry 55 and goes through the center of the respective delivery spout 51 and 52. The orifices 54 are located on the inboard sides of the planes 56. The orifices 53 are located on the outboard sides of the planes 56 and each orifice 53 is off-set about an angle 57 of about 30° with respect to the plane 56 around the vertical center line 115 (FIG. 5) of the respective delivery part 41 or 42 and of the round bottom plate 59. The orifices 53 and 54 are each located in front of a plane 60 extending transverse of the intended direction 58 of operative travel of the spreader and going through the center lines 115. The orifices 53 and 54 are located near the front edge of the bottom plate 59, as viewed in the direction 58.

The spouts 51 and 52 are intercoupled by a supporting plate 61, which is fastened, for example welded, to the spouts at a height 62 above the underside of the bottom plate 59. The supporting plate 61 bears on the top sides of the supporting beams 22 and 23 at the parallel parts 24 and 25. The parallel parts 24 and 25 are parallel to the inboard walls of the delivery spouts which are square as viewed in horizontal cross-section and, as can be seen in FIG. 1, they are located near those walls. The supporting plate 61 is fastened to each of the parts 24 and 25 by two bolts 63, for which purpose the beams 22 and 23 have holes 64 for receiving the bolts 63.

Figure 5:
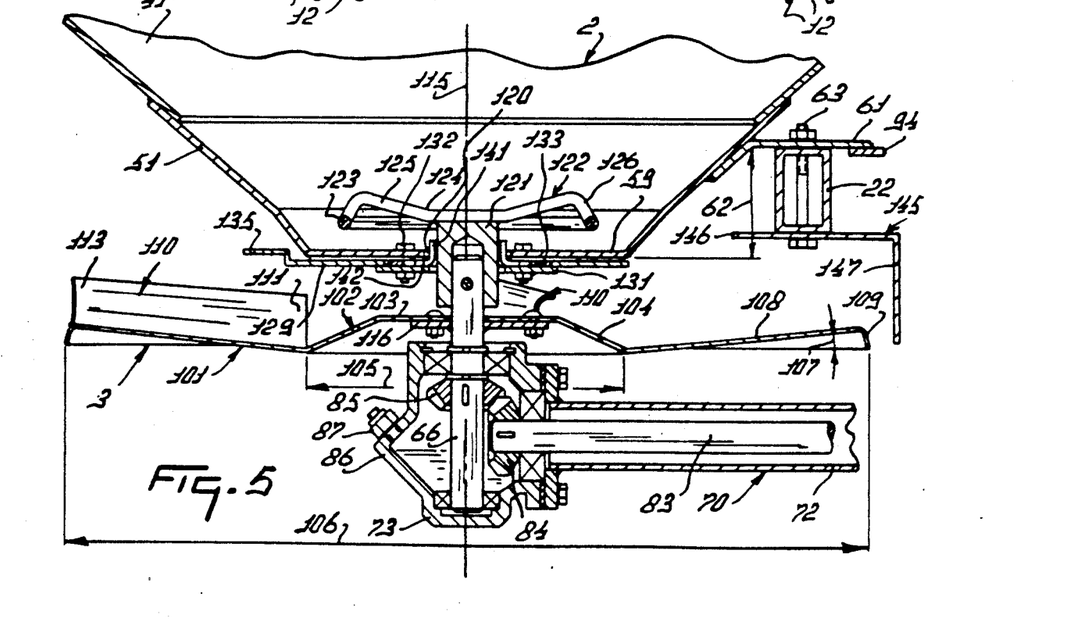
FIG. 5 is a sectional view taken on the line V—V in FIG. 3.
Figures 6, 7:
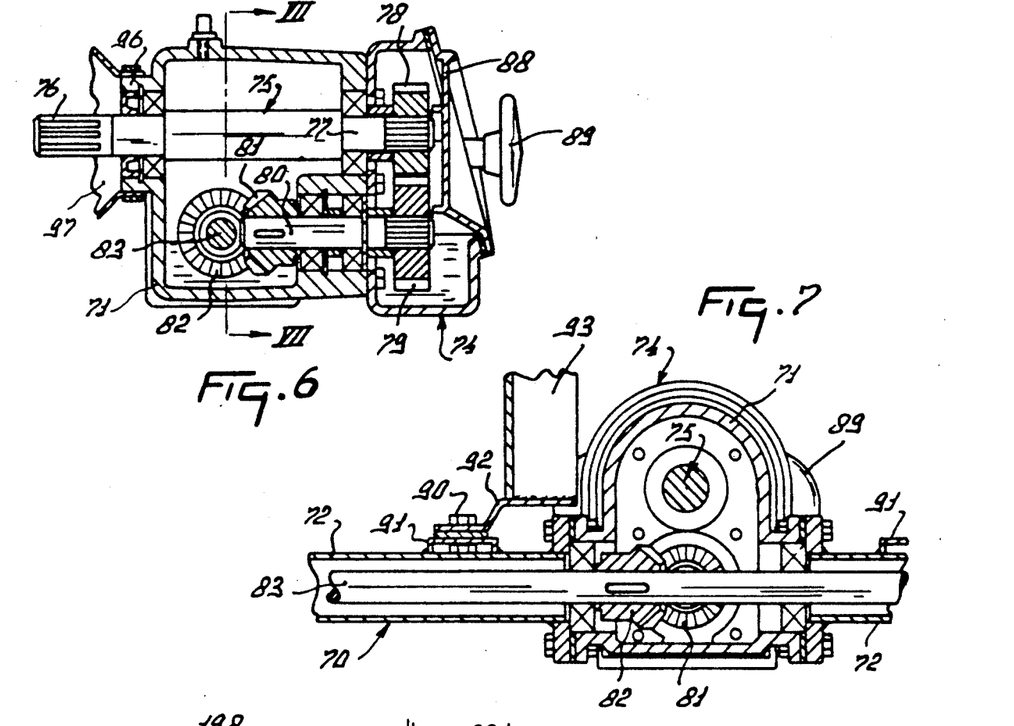
FIG. 6 is a sectional view taken on the line VI—VI in FIG. 1.
FIG. 7 is a sectional view taken on the line VII—VII in FIG. 6.

The supporting plate 61 supports the distribution members 3 and 4 with their driving means on the supporting beams 22 and 23. The distribution members 3 and 4 are mounted on a carrier 70. The carrier 70 comprises a central casing 71 on each side of which are mounted hollow shaft carrying members 72. The ends of the carrying members 72 away from the central casing 71 are provided with gear boxes 73 in which shafts 66 and the distribution members 3 and 4 are journalled. To the rear side of the central casing 71 with respect to the direction 58 is fastened a change-speed box 74. In the casing 71 is journalled a coupling shaft 75, the front end 76 of which emerges from the front of the casing and the rear end 77 of which extends into the box 74. The shaft end 77 is provided with a gear wheel 78 which co-operates with a gear wheel 79 on a shaft 80. The shaft 80 is journalled in the central casing 71 perpendicularly beneath the shaft 75, the centre lines of the shafts 75 and 80 being located in the plane of symmetry 55. At the front end extending into the casing 71 the shaft 80 is provided with a bevel gear wheel 81, which co-operates with a bevel gear wheel 82 on a driving shaft 83. The shaft 83 extends across the central casing 71 and the carrying members 72, the end of the shaft 83 extending into the gear boxes 73. The ends of the shaft 83 located in the gear boxes 73 are provided with bevel gear wheels 84 co-operating with bevel gear wheels 85 arranged on the shafts 66. In FIG. 5 it can be seen that the gear boxes 73 are provided on their outboard sides with extensions 86 having filler caps 87.

The box 74 is provided with a closing cover 88, which is secured to the box 74 by two releasable fastening knobs 89 (only one is visible in FIG. 2).

On both sides of the central casing 71 the carrying members 72 are provided with supports 91 which protrude, as viewed in the direction 58, in front of and behind the carrying members 72 extending transversely of the direction 58. The support 70 is connected to the supports 91 by bolts 90. The supports 91 connect the support 70 to two brackets 92 welded to the underside of strip-shaped intermediate pieces 93. As will be seen in FIG. 4, the strips 93 are V-shaped and are fastened to the underside of a fastening plate 94. The fastening plate 94 is secured by bolts 95 to the supporting plate 61. The bolts 95 are located above the bolts 90. The plate 94 covers substantially the whole distance between the supporting beams 22 and 23 and the bolts 95 are located close to the parallel ends 24 and 25 of the supporting beams 22 and 23. The support is substantially symmetrical with respect to the plane 55.

The coupling part 76 of the shaft 75 protruding from the front of the casing 71 is journalled in a bearing 96 of the casing 71, about which casing a protective plate 97 is arranged, which flares forwardly.

The distribution members 3 and 4 are identical mirror images of each other and therefore only the distribution member 3 will be described in detail. The distribution members 3 and 4 are symmetrical in shape with respect to the plane 56. The distribution member 3 comprises a circular plate 101, the central part 102 of which is raised and has a flat central part 103 and a conical rim 104. The central part 102 has a diameter 105, which is slightly larger than one third and smaller than one-half the diameter 106 of the plate 101. From the central part 102 the plate 101 has a surface 108 which flares upwardly at an angle 107 of about 6°. At outer edge of the plate 101 there is a downwardly bent-over rim 109. In this embodiment four ejection blades 110 are arranged on the part 108. The blades 110 are each disposed in a trailing position with respect to the intended direction or rotation 112. The inner end 111 lead with respect to the ends 113 by an angle 114 of about 15°.

The plate 101 of the distribution member 113 is secured to a fastening plate 116 welded to the shaft 66. The blades 110 extend, as will be apparent from FIG. 4, from the outer edge 106 to near the circumference of the central part 102.

In each delivery spout 51 and 52, at a short distance above the bottom plate 59, there is an agitator 122 as shown in FIG. 5 for the delivery spout 51. The bottom plate 59 of the spout 51 has an orifice 120. The shaft 66 extends up to the orifice 120 and is provided with a hub 121 which extends through the orifice 120 into the lower end of the delivery spout 56. The hub 121 forms part of the agitator 122, which comprises a ring 123 concentric with the hub 121. The ring 123 is coupled by two aligned spokes 124 with the hub 121. The spokes 124 have parts 125 which are slightly inclined upwardly away from the hub and have at the ends downwardly bent end parts 126, which are connected with the ring 123.

Dosing members 129 and 130 cooperate with the delivery spouts 51 and 52. The dosing members 129 and 130 are identical mirror images of one another and arranged symmetrically in shape with respect to the plane 55. The two dosing members are mounted in an identical manner beneath the delivery spouts concerned, and consequently only the dosing member 129 will be described in detail (FIG. 5). The dosing member 129 comprises a ring located beneath the bottom plate 59 and bearing on a supporting ring 131, which is fastened by bolts 132 beneath the bottom plate. Between the ring 131 and the bottom plate 59 is arranged a spacer ring 133 in a manner such that a groove is left between the outer periphery of the ring 133 and the supporting ring 131 for rotatably holding the inner rim of the dosing ring 129. The dosing ring 129 is rotatable about the outer periphery of the ring 133 and about the axis of rotation 115 of the shaft 66. The dosing ring 130 has two passage openings 134. These openings 134 are arranged around centerline 115 in the same manner as the orifices 53 and 54. The dosing ring 129 is provided with a flaring collar 135, to which is pivoted a rod 136, which is pivotally coupled with a control arm 137 rigidly secured to a control shaft 138. In the same manner the dosing ring 130 is pivotally coupled by means of a rod 139 with a control arm 140, which corresponds with the arm 137 and is also fastened to the control shaft 138.

The diamter of the opening 120 is larger than the outer diameter of the hub 121. The opening 120 is sealed by a sealing ring 141 of slightly flexible material having a radial flange 142 on the underside. The flange 142 is held between the bottom plate 59 and the supporting ring 131. The inner diameter of the spacer ring 133 is greater than the diameter of the ring 131 and than the diameter of the opening 120. The ring 141 extends axially along the hub 121 through the opening 120 as far as a position above the bottom plate 59 in the hopper.

Around the inboard sides of the distribution members 3 and 4 are arranged protective hoods 145. The hoods 145 are arranged symmetrically with respect to the vertical plane 55 and have symmetrical shapes; as will be seen from FIG. 5, they have an angular cross-section with a horizontal side 146 and a vertical side 147. The lower edge of the side 147 is located at a lower level than the top edge of the rim 109 of the plate 101 of the distribution member concerned. The protective hoods 145 are fastened to the underside of the supporting beams 22 and 23 by means of the bolts 63, by which the support 61 is secured to the top of the supporting beams 22 and 23.

The control shaft 138 is arranged in front of the delivery spouts 41 and 42 of the hopper and is rotatably journalled in strips 150 and 151 fastened to the hopper. The control shaft 138 extends, as seen from the front, over a length substantially equal to the width of the hopper at the level of the control shaft 138 (FIG. 1). The strip 151 is provided with a setting member 152 comprising a plate 153 fastened to the strip 151 and having the shape of a sector and being provided at its outer periphery with an arcuate plate 154 centered on the axis of the control shaft 138. The plate 154 is located at a short distance from the plate 153 and is coupled at its ends with the plate 153 so that a slot is left between the plates 153 and 154. This slot accommodates an adjusting arm 155, which is fixedly coupled with the control shaft 138. The plates 153 and 154 have registering holes 156. A stop 157 formed by a pin can be passed at will through a pair of registering holes 156.

Near the plane 55 the control shaft 138 is provided with aligned arms 160 and 161. The arms 160 and 161 are coupled with hydraulically controlled control arms 161 and 162 bearing on a support 164, which is arranged on the supporting plate 61. The arms 162 and 163 are hydraulically controllable in a manner such that their length is variable. The hydraulically controllable arms 162 and 163 are coupled by means of hoses 165 with a hydraulic control mechanism of a vehicle to which the spreader is hitched.

On the left-hand side, viewed with respect to the direction 58, the hopper has fastened to it a rockable indicating member 168. This indicating member comprises a pointer 170, which is freely rotatable about a pin 169. The pin 169 is fastened to a support 171 arranged on the side wall of the hopper. Near the end of the pointer 170 a bracket 172 is fastened to the hopper. The bracket 172 is provided with a scale 173. The pointer 170 is retained on the shaft 169 by a wing-nut 174.

The hopper is provided on the top with a canvas cover 176. The canvas cover 176 is fastened by means of elastic tapes 177 to hooks 178 provided on the hopper. At the top of the funnel-shaped delivery parts 41 and 42 tapering downwards have two sieves 180. These sieves 180 each have a rectangular frame 181 enclosing a more or less fine mesh 182. The frame 181 is provided with handles 183. The frame 181 of each sieve is such that this frame bears on the upper regions of the walls of the delivery parts 41 and 42. The sieves 180 are located in the upper region of each delivery spout 41 and 42 one on each side of the junction 43.

For operation the spreader is hitched to the three-point lifting device of a tractor or a similar vehicle, the lower fastening strips 12 being coupled with the lower arms and the fastening strips 13 with the top arm of the three-point lifting device. The front end 76 of the coupling shaft 15 is connected through an auxiliary shaft with the power take-off shaft of the tractor.

The material to be spread is put into the hopper. If desired, the sieves 180 are fitted before filling in order to prevent large lumps of material from getting into the delivery parts 41 and 42.

After the hopper is filled, it can be covered by the cover 176 if it is desired with regard to weather conditions, to avoid wetting of the material and its escape from the hopper, for example by wind action.

For spreading the material, it is fed from the hopper to the distribution members 3 and 4. In order to spread the material in a desired manner the spreader must be suitably positioned by the lifting device above the surface to be covered. Usually the spreader is arranged so that the distribution members 3 and 4 are parallel to the surface to be covered. The orientation of the spreader can be checked by means of the indicating device 168. The distribution members 3 and 4 will be horizontal when the pointer 170 coincides with the extreme right-hand part of the scale 173 as shown in FIG. 2. It may be desirable under some conditions to dispose the distribution members 3 and 4 such that they are inclined upwardly from front to rear. This can be achieved by changing the length of the top rod of the three-point lift, which is coupled with the strips 13. The inclined position of the spreader can be read from the position of the indicator 170 with respect to the scale 173 and the bracket 172. The inclined position of the distribution members may be used for ejecting the material obliquely upwards so that it can be spread over a larger distance. This position may, moreover, be used for spreading material on standing crop. If desired, the spreader can be inclined downwardly from front to rear. This may be important for spreading material down into standing crop. For this purpose the scale 173 can be extended to the right (FIG. 2). When the spreader is arranged in the desired position, the material can be spread by feeding it from the hopper to the distribution members during the travel of the spreader. For spreading, the distribution members 3 and 4 are rotated, for example, from the power take-off shaft through the shaft 5. The distribution members are thus rotated in the direction of the arrow 112, the outboard sides of the distribution members 3 and 4 thus moving rearwards with respect to the direction 58 and thus in the direction in which the material is mainly spread. The driving effort is transferred from the shaft 75 through the gear wheels 78 and 79 to the shaft 80. The shaft 80 drives through the wheels 81 and 82 the shaft 83, which, in turn, drives the shafts 66 of the distribtution members through the wheels 84 and 85. The speed of rotation of the distribution members can be changed by interchanging the wheels 78 and 79 or by arranging other gear wheels having different numbers of teeth on the shafts 75 and 80. Thus, the rotary speed of the distribution members can be controlled. The mode and, in particular, the distance of ejection of the material from the distribution members depend on the speed of rotation of these distribution members.

The amount of material flowing per unit time from the hopper can be controlled by closing the outlet ports 53 and 54 to a greater or lesser extent by means of the dosing members 129 and 130 respectively. When setting the dosing members the outlet ports 134 will coincide to a greater or lesser extent with the outlet ports 53 and 54. The position of the dosing members 129 and 130 can be adjusted by means fo the adjusting mechanism comprising the setting member 152 and the control shaft 138 with the control arms 162 and 163. The ports 134 will be located entirely to one side of the ports 53 and 54, when the control arm 155 is located near the lower end of the plates 153 and 154. The adjusting arm 155 then bears on the junction between the plates 153 and 154, which junction thus constitutes a stop. In the completely open position in which the ports 134 register fully with the ports 53 and 54, the adjusting arm 155 is located near the other end of the plate 154. An intermediate position can be determined by means of the pin 157, which can limit the upwards movement of the adjusting arm 155 and which can thus be used to determine the extent of overlap of the ports 134 with the ports 53 and 54 for adjusting the free passage of the outlet ports 53 and 54.

The adjustment of the dosing members 129 and 130 with respect to the delivery spouts 51 and 52 and hence with respect to the outlet ports 53 and 54 is preferably performed from the vehicle carrying the device.

In this embodiment the dosing members 129 and 130 can be hydraulically controlled from the tractor. For this purpose the lengths of the control arms 162 and 163 can be varied through the duct 165 and a corresponding duct coupled with the hydraulically controlled arm 163. When oil is fed to the arm 162 it will be lengthened so that the distance between the support 164 and the arm 160 is enlarged and the control arm 160 will turn to the left as seen in FIG. 2. As a result the adjusting arm 155 will move towards the lower edge of the plate 154 until it reaches the zero position. In moving to this position the control shaft 138, acting through the arms 137 and 140 respectively and the rods 136 and 139, will rotate the dosing members 129 and 130 respectively so that the outlet ports 133 and 134 are located entirely to the side of the ports 53 and 54 so that no material can pass from the hopper to the distribution members. By removing the pressure in the duct 165 and by raising the pressure in the duct coupled with the arm 163 the distance between the arm 161 and the support 164 will increase by the increase in length of the arm 163. Thus the control shaft 138 will turn clockwise as seen in FIG. 2. The adjusting arm 155 is thus moved upwardly up the stop 157, which determines the extent of maximum overlap of the ports 134 and the ports 53 and 54.

Although in this embodiment the arms 162 and 163 are hydraulically controllable, they may, as an alternative, be constructed so as to be mechanically controllable.

The pin 157 can be readily inserted into any registering pair of holes 156 by positioning the adjusting member 152 near the side of the hopper. The positions of the control arm 138 and of the adjusting member 152 at the front of the hopper provide the advantage that the adjusting mechanism cannot be soiled by material ejected by the distribution members 3 and 4 so that the adjusting mechanism remains readily controllable and can be easily kept in good condition. The location of the arms 162 and 163 near the middle of the machine and the coupling with the control arm 138 at the center facilitate the turn of the control arm and provide an advantageous mode of connection of the control members with the tractor.

The shape of the frame of the spreader and the connection of the hopper to it allow ready access to all parts of the spreader, while the frame can be easily manufactured and the various parts can be readily mounted thereon. In the construction shown the driving members for the distribution members 3 and 4 can also be readily mounted.

The distribution members 3 and 4 with the carriers 70 and the casings 71 and 74 coupled to it constitute a single unit which is fastened by the intermediate pieces 93 and the plate 94 to the supporting plate 61. The distribution members 3 and 4 are coupled by the plate 61 to the delivery spouts 51 and 52 and together they are arranged on the supporting beams 22 and 23. Owing to the coupling of the distribution members 3 and 4 with the supporting plate 61 a fixed position of the distribution members 3 and 4 relative to the delivery spouts 51 and 52 and therewith to the hopper is ensured. Therefore, the distribution members 3 and 4 are constantly held in the correct position in which they are disposed during mounting with respect to the outlet ports 53 and 54. Thus the material can always flow in the desired manner to the distribution members from the hopper so that it can be spread in the desired direction.

When the carrier 70 with the distribution members 3 and 4 is mounted on the supporting plate 61, the position of the distribution members 3 and 4 relative to the underside of the delivery spouts 51 and 52 can be adjusted. Moreover, the distance 62 can be adjusted to the desired value during this mounting operation. If desired, the delivery spouts 51 and 52 can be fixedly coupled with the rest of the delivery parts 41 and 42, for example, by welding. The weight of the hopper is supported by the beam 46 and the supporting plate 61 on the frame. If the spreader with the completely filled hopper travels across an uneven surface, various parts of the frame may bend slightly, but even with the slightest flexure the position of the distribution members 3 and 4 relative to the hopper will not change, since these distribution members 3 and 4 are connectd to the hopper by the supporting plate 61 and not by the frame. The hopper and hence the distribution members 3 and 4 can constantly be held in the desired position, since the indicating member 168 mounted on the hopper displays the orientation of the hopper and the distribution members 3 and 4.

The position of the ports 53 and 54 around the center lines 115 of the distribution members 3 and 4 is chosen so that the material is supplied at the desired place to the distribution members for spreading it in the desired direction. Thus, the position indicated for the outlet ports 53 and 54 with respect to the plane 56 is important.

In this embodiment the ports 53 and 54 are positioned so that the distribution members 3 and 4 both spread to the material over coinciding sectors. Owing to the symmetrical disposition of the delivery parts 41 and 42 with their outlet ports and to the symmetrical position of the distribution members 3 and 4 with respect to the plane 55, and owing to their direction of rotation, the sectors covered by the material will be symmetrical about the plane 55. During operation of the spreader each of the distribution members will spread the material over substantially the whole width of the strip to be covered so that a very uniform distribution of the material on the strip is obtained.

A satisfactory flow of material through the outlet ports is ensured by the agitators 122 and the delivery spouts 51 and 52 of the hopper. These agitators have a shape such that the material is kept moving above the outlet ports without being comminuted or compressed in an undesirable manner. The agitators 122 can be readily mounted on the shafts 66, since the openings 120 in the bottom plates 59 of the hopper parts are large compared to the diameter of the hubs 121. A satisfactory seal of the openings 120 is obtained by means of the sealing rings 141, which can be readily arranged between the bottom plate 59 and the supporting ring 131. The protective hoods 145 are located outside the sectors to be covered by the material ejected by the distribution members and they serve to screen parts of the machine from scattered material. The shape of the distribution members 3 and 4 shown enables them to provide a uniform distribution of the material over the spreading sector of each distribution member, while the material can be ejected over a comparatively large distance by each of the distribution members in dependence on the speed of rotation of the distribution members. Owing to the shape of the distribution members the material emanating from the outlet ports 53 and 54 will readily flow over the conical surface 104 of the central part 102 towards the spreading arms 110, which can readily capture the material by their inner ends 111 from the central part 102. Owing to their shape the distribution members can be readily manufactured.

Figure 8:
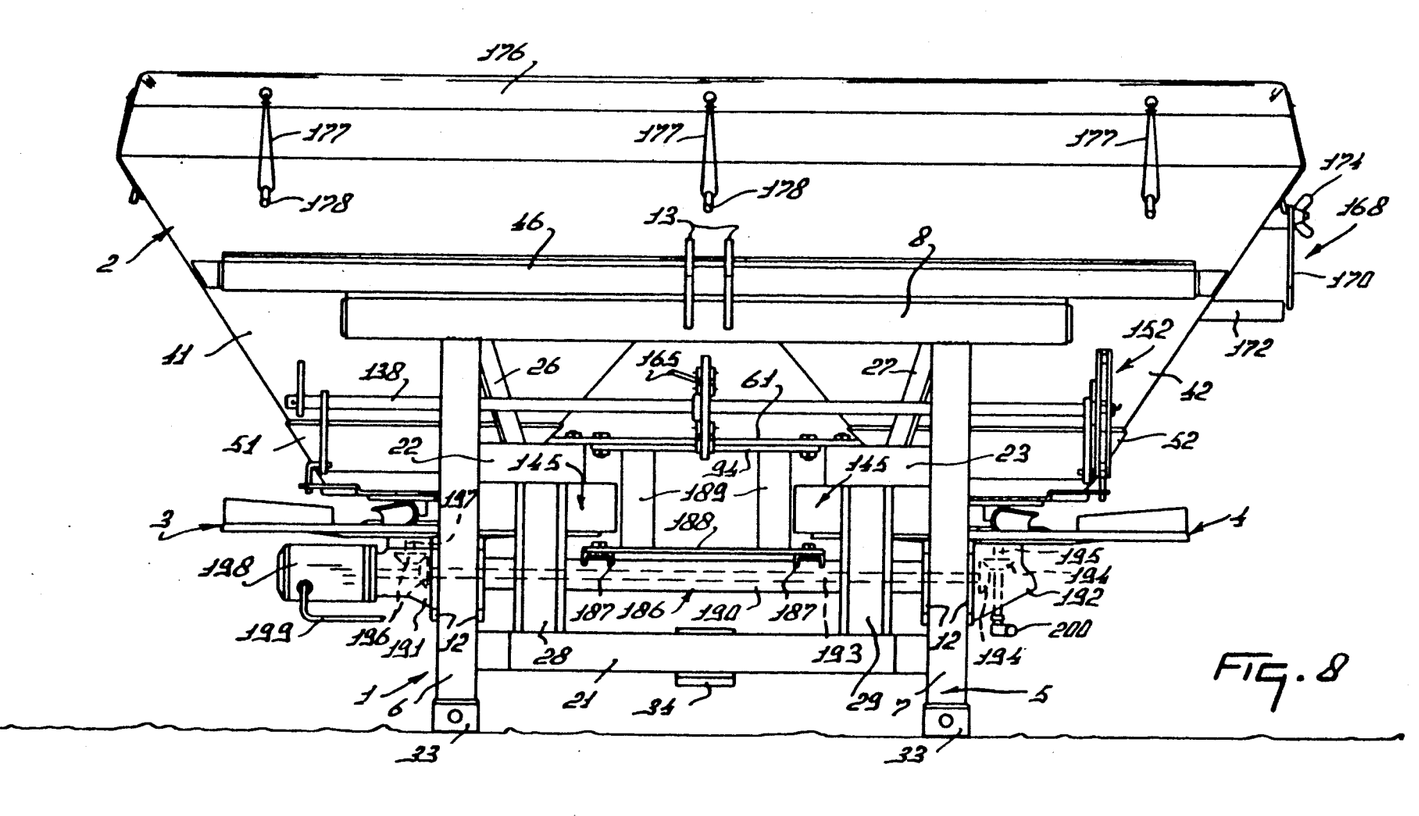
FIG. 8 is a front view of another spreader which is a further embodiment of the invention.
Figure 9:
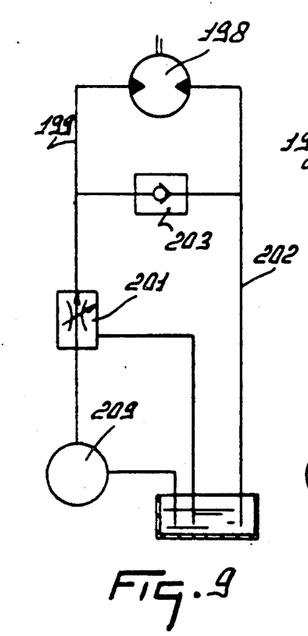
FIG. 9 is a hydraulic circuit diagram representing the drive circuit of the spreader shown in FIG. 8.

FIGS. 8 and 9 show an embodiment in which the spreader is largely identical to that shown in the preceding Figures, but the drive of the distribution members 3 and 4 differs. Corresponding parts of the spreader shown in FIGS. 8 and 9 are designated by the same reference numerals as those parts in FIGS. 1 to 7. In this embodiment the distribution members 3 and 4 are arranged on a carrier 186 having supports 187. To the supports 187 is fastened a plate 188, which is secured by means of intermediate pieces formed by strips 189, which correspond with the strips 93, to the plate 94. The plate 94, and consequently the carrier 186, is fastened to the supporting plate 61 as before. The carrier 186 comprises a hollow carrying member 190, at the ends of which gear boxes 191 and 192 are provided below the distribution members 3 and 4. Through the carrying member 190 extends a driving shaft 193, which is coupled at the wheel joining the box 192 through gear wheels 194 with the shaft 195 of the distribution member 4. In the box 191 the shaft 193 is coupled through gear wheels 196 with the shaft 197 of the distribution member 3. To the box 191 is fastened a hydraulic motor 198, which is coupled with the shaft 193. The motor 198 communicates by means of a line 199 with the hydraulic driving system of a vehicle, for example, a tractor carrying the spreader.

As in the preceding embodiment, the distribution members 3 and 4 with their drive are carried entirely by the supporting plate 61 which supports them, together with the spouts 51 and 52, on the supporting beams 22 and 23. In this embodiment the shaft 195 is provided with a connecting member 200 for a revolution counter to indicate the speed of rotation of the shaft 195. The shafts 195 and 197 are interconnected so that they rotate at equal speeds when the shaft 193 is driven by the motor 198. During operation of the spreader of FIG. 8 the motor can be driven from the hydraulic system of the tractor. The revolution counter with the coupling member 200 helps in keeping the desired speed of the distribution members 3 and 4 constant and enables a constant check to be made. If desired, the drive of the motor 198 from the hydraulic system of the tractor can be rendered adjustable for this purpose.

FIG. 9 illustrates schematically the drive circuit of the motor 198. The motor 198 is coupled through the duct 199 with the pump 209 of the tractor. The device comprises a control-valve 201 arranged in the supply line 199 to the motor 198 for controlling the speed of rotation of the motor 198. The tractor carrying the spreader will comprise a control valve for closing or opening respectively the feed from the pump 198 to the line 199 and the motor 198. Between the supply line 199 and the return line 202 is arranged an overflow valve 203 associated with the spreader and the motor 198. When the flow from the pump 209 to the motor 198 is cut of the motor will have a certain momentum. In order to avoid the motor 198 stopping too abruptly when the flow from the pump 209 to the motor is cut off, the overflow device 203 is provided. The momentum of the motor 198 is capable of maintaining the circulation of the oil contained in the pump and in parts of the ducts 199 and 202 via the overflow 203 until the momentum is dissipated and the motor 198 hence the distribution members 3 and 4 come to a standstill.

Figure 10:
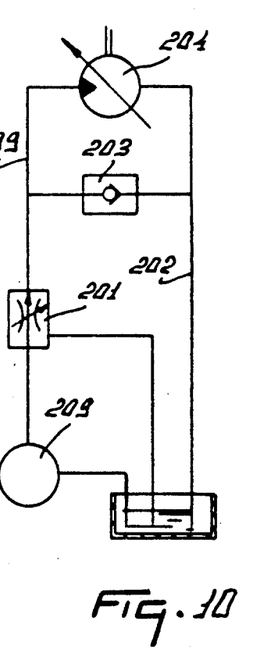
FIG. 10 corresponds to FIG. 9, but represents an alternative drive circuit.

FIG. 10 is a circuit diagram in which the motor corresponding with the motor 198 is a variable motor 204 having, for example, an adjustable swash plate. The adjustment of the motor 204 can be used for increasing the starting torque of the motor to put the drive with the distribution members 3 and 4 into motion. As in the preceding embodiment of FIG. 9 the control valve 201 can be set to a desired value. Particularly in the case of lower power and a high speed of the motor during normal operation it may be advantageous to have a possibility of manually controlling the motor 204 in order to increase the starting torque.

Figure 11:
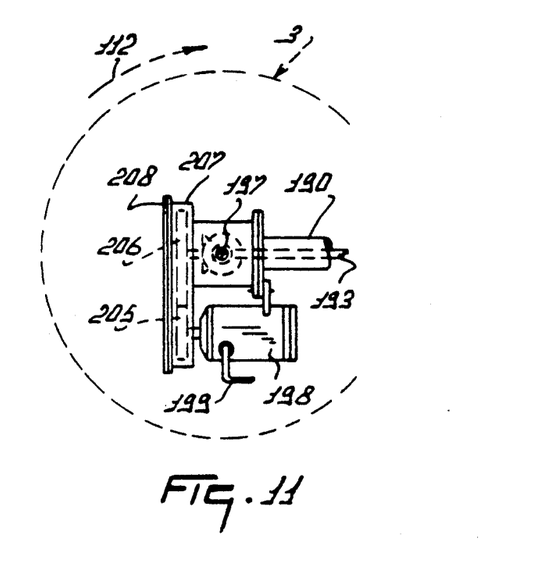
FIG. 11 is a fragmentary sectional view of drive means for a spreader similar to that of FIG. 8.

FIG. 11 schematically shows a construction in which between a hydraulic motor, for example, the motor 198 or 204, and the shaft 193 is arranged a set of gear wheels 205, 206. In this embodiment the motor is arranged at the side of the gear box 191 and the gear wheels 205 and 206 are arranged in a change-speed box 207. The gear wheels 205 and 206 are preferably chosen so that when the motor 198 and the gear wheels 205 and 206 are in the position shown in FIG. 11, the distribution members 3 and 4 can be driven with speeds varying between 250 and 500 rpm. The gear wheels 205 and 206 are interchangeable so that the gear wheel 205 can be directly coupled with the shaft 193 and the gear wheel 206 with the motor 198. The combination of gear wheels is chosen so that in this second position the distribution members 3 and 4 can be driven over a range of speeds lying between 500 and 1000 rpm. In order to facilitate the interchange of the gear wheels 205 and 206 the box 207 is provided in a manner not shown with a readily removable cover 208.

Although various features of the spreaders described, and illustrated in the drawings, will be set forth in the following claims as inventive features, it is to be noted that the invention is not necessarily limited to these features and encompasses all of the features that have been disclosed both individually and in various combinations.

Having disclosed our invention, what we claim as new to be secured by letters patent of the United States is:

1. A spreader for spreading granular and/or powdery material which comprises: hopper means having two spaced apart delivery means for discharging material carried by said hopper; two rotating distribution means for receiving said material discharged from said hopper means through said delivery means and broadcasting said material simultaneously in patterns which overlap for substantially their entire widths, each said distribution means adapted to receive material from a respective said delivery means; means for revolving said distribution means comprising a mechanical linkage between said distribution means, a single hydraulic motor connected to said linkage, said linkage and said connection being so constructed and arranged that said distribution means both revolve at the same rpm and in opposite directions, control means for controlling the rpm of said hydraulic motor, and momentum conservation means for continuing the rotation of said motor for at least a limited period of time when there is an abrupt cessation or reduction of the energy which provides power to said motor; a rigid framework interconnecting said linkage and said delivery means which retains said delivery means and the levels and axes of rotation of said distribution means in fixed dispositions relative to each other.

2. A spreader in accordance with claim 1 wherein said framework includes a hollow carrier having a tube which contains said linkage, saidd tube being directly under at least one of said distribution means and rigidly and directly connected by further components of said framework to said hopper means at each of said delivery means, said carrier supporting said motor.

3. A spreader in accordance with claim 2 wherein said delivery means comprises two delivery spouts, said delivery spouts each being independent of the remainder of said hopper means, said framework directly connected to each said delivery spout and providing a direct connection between said delivery spouts.

4. A spreader in accordance with claim 3 wherein said framework's connections to said distribution means, said delivery spouts, said tube and between said delivery spouts and said connections all contain the same substantially vertical plane.

5. A spreader for spreading granular and/or powdery material which comprises: two rotating distribution means for broadcasting said material simultaneously in patterns which overlap for substantially their entire widths; mechanical linkage which comprises a horizontal shaft, two vertical shafts which each revolve a respective distribution means, and two gears rigidly received on said horizontal shaft meshing with an individual gear on each said vertical shaft; carrier means which is a rigid structure comprising a hollow member and two gear boxes at either end thereof, said horizontal shaft extending through said hollow member and into each of said gear boxes, said hollow member establishing the fixed positions of said gear boxes and said vertical shafts; and one hydraulic motor fastened to one of said gear boxes drivingly connected to said mechanical linkage, said one hydraulic motor rotating both said distribution means via said mechanical linkage.

6. A spreader in accordance with claim 5 wherein said horizontal shaft is continuous and said motor is directly connected to revolve said horizontal shaft.

7. A spreader in accordance with claim 6 which comprises a hydraulic system including said hydraulic motor, said system comprising momentum conservation means for permitting said motor to revolve at least for a limited period of time in the event of failure of the power supply to said motor.

8. A spreader in accordance with claim 7 wherein said momentum conservation means comprises an overflow valve between the hydraulic fluid supply line and the hydraulic fluid return line for said hydraulic motor.

9. A spreader for spreading granular and/or powdery material comprising at least two distribution members disposed at the same horizontal level which are drivable in rotation about upwardly extending rotary axes, feeding means being provided for supplying material to said distribution members so that each of said two distribution members receives material at a location offset from the rotary axis of the respective said distribution members, means intercoupling said distribution members for rotating them at the same speed from a common power source, said intercoupling means including a gear between a connection for said power source and at least one said distribution member, said distribution members being drivable by said intercoupling means in opposite senses such that their regions of nearest approach move in a direction opposite the general direction to which the material is ejected from said distribution members during operation, said feeding means being constructed and arranged to feed material to said distribution members during operation so that the areas covered by said dsitribution members substantially coincide throughout with one another, said feeding means comprising a hopper and at least one further gear, and said power source comprising a hydraulic motor, said two distribution members being mechanically intercoupled by said gears and driven by said hydraulic motor, an agitator extending from at least one said distribution member into said hopper, said agitator comprising a ring which is coaxial with a rotary shaft provided for such distribution member, spokes connecting said ring to said shaft via a central hub, said spokes inclined upwardly away from said ring and then downwardly towards said central hub.

10. A spreader for spreading granular and/or powdery material comprising at least two distribution members disposed at the same horizontal level which are drivable in rotation about upwardly extending rotary axes, feeding means comprising a hopper being provided for supplying material to said distribution members so that each of said two distribution members receives material at a location offset from the rotary axis of the respective said distribution members, means intercoupling said distribution members for rotating them at the same speed from a common power source, said intercoupling means including a gear between a connection for said power source and at least one said distribution member, said distribution members being drivable by said intercoupling means in opposite senses such that their regions of nearest approach move in a direction opposite the general direction in which the material is ejected from said distribution members during operation, said distribution members being positioned relative to one another and said feeding means being constructed and arranged to feed material to said distribution members during operation so that the areas as they are receiving said material substantially simultaneously from said distribution members substantially coincide with one another, said spreader further comprising at least one further gear and said power source comprising a hydraulic motor, said two distribution members being mechanically intercoupled by said gears and driven by said hydraulic motor.

11. A spreader as claimed in claim 10, comprising a carrier wherein said motor is arranged near one end of said carrier, said two distribution members being mounted on said carrier, said carrier being provided with a driving shaft coupled with said hydraulic motor.

12. A spreader as claimed in claim 10, comprising means for adjusting said motor to vary the speed of rotation of said distribution members at least within limits.

13. A spreader as claimed in claim 12, said means for adjusting said motor comprises a swash plate which is adapted to adjust the speed of said motor.

14. A spreader as claimed in claim 12, comprising a fluid supply line to said motor, said means for adjusting said motor comprising a control element arranged in said line adapted to adjust the speed of said motor.

15. A spreader as claimed in claim 10, comprising an hydraulic fluid supply line and a hydraulic fluid return line for said motor where an overflow valve is arranged between said supply line and said return line.

16. A spreader as claimed in claim 10, comprising a drive shaft with which said distribution members are connected wherein between said motor and said drive shaft said gears comprising transmission members and having unequal numbers of teeth are arranged, said gears being interchangeable with each other.

17. A spreader as claimed in claim 10, comprising a revolution counter which is coupled with one of said distribution members.

18. A spreader as claimed in claim 10, wherein at least one said distribution members comprises an ejector blade which is curved throughout its upper part so as to be as seen in vertical cross section convex relative to its direction of rotation and which has its end farthest remote from the rotary axis of such distribution member located at a higher level than its end nearest said rotary axis.

19. A spreader as claimed in claim 10, wherein each said distribution members comprises a peripheral rim, at least one ejection blade and a disc having a surface extending conically from said peripheral rim towards its center in downward direction, said ejector blade mounted substantially entirely on said conical surface, a central part of said disc being raised above said conical surface.

20. A spreader as claimed in claim 10, wherein each said distribution member is arranged on an upwardly extending shaft, said shaft extending through an opening in the bottom of said hopper and being provided inside said hopper with an agitator, a flexible sealing member being arranged in said opening disposed around the periphery of said shaft and being fixed in place below the bottom of said hopper and also extending along said shaft into said hopper.

21. A spreader as claimed in claim 10, wherein said hopper comprises an outlet, dosing means arranged proximate said outlet for closing said outlet a selected extent for controlling the flow of material from said hopper to each said distribution member.

22. A spreader as claimed in claim 10, wherein said hopper comprises outlet ports over each said distribution member, one said port in each said distribution member being located on the inboard side of a vertical plane that extends in the spreader's usual direction of travel going through the rotary axis of its respective distribution member, the other said port being located on the other side of said plane.

23. A spreader as clamied in claim 22, wherein one edge of said one port is located adjacent said plane, whereas the other said port is spaced by an angle of about 30 degrees about the rotary axis of the respective said distribution member away from said plane.

24. A spreader as claimed in claim 23, wherein with respect to the intended direction of travel of the spreader, said two outlet ports are located in front of a plane containing said rotary axis of the respective said distribution member and extending transverse of said direction of travel.

25. A spreader as claimed in claim 24, comprising a dosing member, a control shaft which is mounted at least partly on said hopper coupled to said dosing member.

26. A spreader as claimed in claim 25, wherein said control shaft is privided with at least one control arm, a hydraulically operated control mechanism coupled with said control arm.

27. A spreader as claimed in claim 25, comprising a control mechanism and a supporting member, wherein said control shaft is coupled with said control mechanism which is carried by said supporting member.

28. A spreader as claimed in claim 27, wherein said control shaft is provided with an adjusting member arranged near one side of the spreader, said adjusting member comprising an adjusting arm, a guide along which said adjusting arm is movable, and an adjustable stop for adjusting the maximum area of said outlet ports.

29. A spreader as claimed in claim 10, comprising means for driving such distribution members so their outboard sides move in the direction in which the material is mainly broadcast therefrom.

30. A spreader as claimed in claim 10, comprising means for attaching the spreader to the 3/point lifting device of a tractor and indicating means for displaying the orientation of the spreader with respect to a vertical plane at right angles to the intended direction of travel of the spreader.

31. A spreader sd claimed in claim 30, wherein said indicating means comprises a scale, a shaft and a pointer which hangs downwardly and is freely movable across said scale.

32. A spreader as claimed in claim 10, wherein said hopper comprises at least two delivery parts which are separated from one another, a sieve arranged in the top region of each said delivery part.

33. A spreader as claimed in claim 10, wherein said hopper comprises delivery parts wherein the top region of said hopper is rectangular and joins top edges of said delivery parts.

34. A spreader as claimed in claim 33, comprising adjoining walls of said delivery parts and a supporting strip, said hopper comprising opposite walls coupled with one another by said supporting strip which extends above said adjoining walls of said delivery parts.

35. A spreader as claimed in claim 10, comprising a cover member having elastic said straps, said hopper being provided in its upper region with said cover member which is hooked by said elastic straps across the top of said hopper.

* * * * *